United States Patent
Nito et al.

(10) Patent No.: US 7,537,329 B2
(45) Date of Patent: May 26, 2009

(54) REACTION LIQUID, SET OF INK COMPOSITION AND REACTION LIQUID, AND IMAGE RECORDING METHOD

(75) Inventors: Yasuhiro Nito, Yokohama (JP); Shinichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 11/295,641

(22) Filed: Dec. 7, 2005

(65) Prior Publication Data

US 2006/0125895 A1    Jun. 15, 2006

(30) Foreign Application Priority Data

Dec. 9, 2004   (JP) ............................. 2004-357419
Nov. 15, 2005  (JP) ............................. 2005-329629

(51) Int. Cl.
*B41J 2/17* (2006.01)
(52) U.S. Cl. ..................... 347/96; 347/100; 523/160
(58) Field of Classification Search ... 106/31.01–31.97; 347/1, 54, 96, 86, 100–101; 523/160–161; 428/32.38
See application file for complete search history.

(56) References Cited

U.S. PATENT DOCUMENTS

| 5,250,107 A * | 10/1993 | Bares .................... 106/31.27 |
| 5,734,403 A | 3/1998 | Suga et al. ................. 347/101 |
| 5,782,967 A | 7/1998 | Shirota et al. ............. 106/31.58 |
| 5,958,121 A * | 9/1999 | Lin ......................... 106/31.43 |
| 5,993,524 A | 11/1999 | Nagai et al. .............. 106/31.27 |
| 6,036,307 A | 3/2000 | Hakamada et al. .......... 347/106 |
| 6,084,619 A | 7/2000 | Takemoto et al. ............ 347/96 |
| 6,214,963 B1 | 4/2001 | Noguchi et al. .............. 528/71 |
| 6,286,953 B1 | 9/2001 | Takemoto et al. ........... 347/100 |
| 6,341,854 B1 | 1/2002 | Takemoto .................... 347/96 |
| 6,398,355 B1 | 6/2002 | Shirota et al. .............. 347/100 |
| 6,474,803 B1 | 11/2002 | Shirota et al. .............. 347/100 |
| 6,536,890 B1 * | 3/2003 | Kato et al. ................. 347/100 |
| 6,552,156 B2 | 4/2003 | Noguchi et al. .............. 528/71 |
| 6,596,805 B1 * | 7/2003 | Nigam et al. ............... 524/527 |
| 6,676,254 B2 | 1/2004 | Nagashima et al. ......... 347/100 |
| 6,698,876 B2 | 3/2004 | Sato et al. ................. 347/100 |
| 6,723,137 B1 | 4/2004 | Hakamada et al. ............. 8/549 |
| 6,874,881 B2 | 4/2005 | Suzuki et al. .............. 347/100 |
| 6,929,362 B2 * | 8/2005 | Takada et al. .............. 347/100 |
| 6,932,465 B2 | 8/2005 | Nito et al. ................... 347/96 |
| 6,935,732 B2 | 8/2005 | Takada et al. ................ 347/96 |
| 7,029,109 B2 | 4/2006 | Shirota et al. .............. 347/100 |
| 7,055,943 B2 | 6/2006 | Suzuki et al. .............. 347/100 |

(Continued)

FOREIGN PATENT DOCUMENTS

JP          5-194894        8/1993

(Continued)

*Primary Examiner*—David Wu
*Assistant Examiner*—Vu Nguyen
(74) *Attorney, Agent, or Firm*—Fitzpatrick, Cella, Harper & Scinto

(57) ABSTRACT

A reaction liquid containing a reactive substance that reacts with at least one component in an ink composition containing a coloring material in a dispersed state, in which the reactive substance is a polyvalent metal compound having multiple reactive sites in one molecule, a set of ink and a reaction liquid, and an image recording method for performing image recording by means of the set.

3 Claims, 4 Drawing Sheets

U.S. PATENT DOCUMENTS

| | | | |
|---|---|---|---|
| 7,141,105 B2 | 11/2006 | Udagawa et al. | 106/31.49 |
| 7,144,449 B2 | 12/2006 | Udagawa et al. | 106/31.15 |
| 7,276,110 B2 | 10/2007 | Tsujimura et al. | 106/31.27 |
| 2004/0027404 A1 | 2/2004 | Nagashima et al. | 347/8 |
| 2004/0125185 A1* | 7/2004 | Takada et al. | 347/100 |
| 2005/0195243 A1 | 9/2005 | Nagashima et al. | 347/54 |
| 2005/0204955 A1 | 9/2005 | Nagashima et al. | 106/31.59 |
| 2005/0219341 A1 | 10/2005 | Nito et al. | 347/100 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |
| 2006/0192827 A1 | 8/2006 | Takada et al. | 347/100 |
| 2006/0196389 A1 | 9/2006 | Tsuji et al. | 106/31.43 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/161 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| JP | 6-106735 | 4/1994 |
| JP | 9-207424 | 8/1997 |
| JP | 11-78211 | 3/1999 |
| JP | 2000-37942 | 2/2000 |
| JP | 2003-312119 | 11/2003 |
| WO | WO01/81078 A1 * | 4/2000 |

* cited by examiner

REACTION LIQUID, SET OF INK COMPOSITION AND REACTION LIQUID, AND IMAGE RECORDING METHOD

BACKGROUND OF THE INVENTION

1. Field of the Invention

The present invention relates to a reaction liquid, a set of an ink composition and a reaction liquid, and an image recording method using the set. In particular, the present invention relates to a reaction liquid to be used for the case where printing is performed on a recording medium by using an ink composition and the reaction liquid in combination, a set of an ink composition and a reaction liquid, and an image recording method using the set.

2. Related Background Art

Ink-jet recording that enables a high-resolution and high-quality image to be printed at a high speed by means of an inexpensive apparatus is a printing method involving causing a microdroplet of an ink composition to fly and adhere to a recording medium such as paper to thereby perform printing. Various means for forming a high-quality color image have been conventionally proposed. For example, there is proposed technical means in which a black ink that thickens or aggregates by virtue of an action with a salt and a color ink containing the salt are used in combination to provide a high-quality color image having a high image density and showing no color bleeding (see, for example, Japanese Patent Application Laid-Open No. H06-106735). There is proposed another means in which an ink contains a compound that forms an insoluble complex as a result of a crosslinking reaction with a dye to improve the water resistance of an image (see, for example, Japanese Patent Application Laid-Open No. H05-194894).

There are also proposed various methods each involving preparing a liquid (reaction liquid) for obtaining a better image separately from typical ink-jet ink; causing the liquid to adhere to a recording medium prior to the ejection of a recording ink to form an image (see, for example, Japanese Patent Application Laid-Open No. H09-207424, Japanese Patent Application Laid-Open No. 2000-37942, and Japanese Patent Application Laid-Open No. H11-078211).

However, even the image recording using the combination of a reaction liquid containing a polyvalent metal ion and an ink having the reactivity with the reaction liquid typified by each of Japanese Patent Application Laid-Open No. H09-207424 and Japanese Patent Application Laid-Open No. 2000-37942 may require improvements of scratch resistance and marker resistance at a printed portion having a high image density. In addition, an invention is disclosed, in which the addition of not only a polyvalent metal ion but also a crosslinking agent (borax) for a polymer in an ink to a reaction liquid improves the water resistance of a printed article (see, for example, Japanese Patent Application Laid-Open No. H11-078211).

The inventors of the present invention have made extensive studies. As a result, they have found the following. When one attempts to prepare a conventional reaction liquid containing a polyvalent metal ion and borax serving as a crosslinking agent for polyvinyl alcohol as disclosed in Japanese Patent Application Laid-Open No. H11-078211, a precipitate may be generated to make it impossible to prepare a stable reaction liquid, probably because the polyvalent metal ion and borax are different from each other in ionicity.

There is proposed an attempt to apply a gloss treatment liquid containing no coloring material to an image provided by an ink-jet recording system to improve the gloss of the image (see, for example, Japanese Patent Application Laid-Open No. 2003-312119).

SUMMARY OF THE INVENTION

Therefore, an object of the present invention is to provide a reaction liquid which is excellent in storage stability and can realize excellent scratch resistance and excellent marker resistance even at a region having a high image density such as a solid print portion when used in combination with an ink composition to form an image; a set of an ink composition and a reaction liquid; and an image recording method using the set.

The above object is achieved by the present invention described below. That is, according to one aspect of the present invention, there is provided a reaction liquid comprising a reactive substance that reacts with at least one component in an ink composition comprising a coloring material in a dispersed state, in which the reactive substance is a polyvalent metal compound having multiple reactive sites in one molecule.

According to another aspect of the present invention, there is provided a set of an ink composition and a reaction liquid, the set comprising: an ink composition comprising a coloring material in a dispersed state; and a reaction liquid comprising a reactive substance that reacts with at least one component in the ink composition, in which the reactive substance is a polyvalent metal compound having multiple reactive sites in one molecule.

According to another aspect of the present invention, there is provided an image recording method of recording an image by applying, to a recording medium, a set of an ink composition and a reaction liquid, the set comprising an ink composition comprising a coloring material in a dispersed state; and a reaction liquid comprising a reactive substance that reacts with at least one component in the ink composition, in which the reactive substance is a polyvalent metal compound having multiple reactive sites in one molecule, in which the method including the steps of: (i) applying the ink composition constituting the set of the ink composition and the reaction liquid to the recording medium by means of an ink-jet method; and (ii) applying the reaction liquid constituting the set of an ink composition and a reaction liquid to the recording medium, in which the steps (i) and (ii) are performed in such a manner that the ink composition and the reaction liquid contact with each other on the recording medium.

According to another aspect of the present invention, there is provided a set of an ink composition and a reaction liquid, the set comprising an ink composition comprising a coloring material in a dispersed state; and a reaction liquid comprising a reactive substance that reacts with at least one component in the ink composition, in which the reactive substance is a polyvalent metal compound having multiple reactive sites in one molecule; and when defining a flocculation value as a ratio of the height of an aggregate to the height from the bottom surface of a vessel having an inner diameter of 10 mm to a liquid level after 5 g of the reaction liquid 100-times diluted with water are charged into the vessel, 0.25 g of the ink composition is added dropwise to the vessel, and the whole is left standing for 60 minutes, the flocculation value is less than 0.5.

According to the present invention, a polyvalent metal compound having multiple reactive sites in one molecule is used as a reactive substance that reacts with at least one component in an ink composition (hereinafter referred to as the "ink"), whereby a recorded article excellent in scratch resistance and marker resistance even at a region having a high image density such as a solid print portion as compared to that obtained by using a conventional reaction liquid containing a polyvalent metal ion can be obtained, although a reaction liquid containing the polyvalent metal compound is a reaction liquid with its storage stability maintained.

DESCRIPTION OF THE PREFERRED EMBODIMENTS

Figure 1:
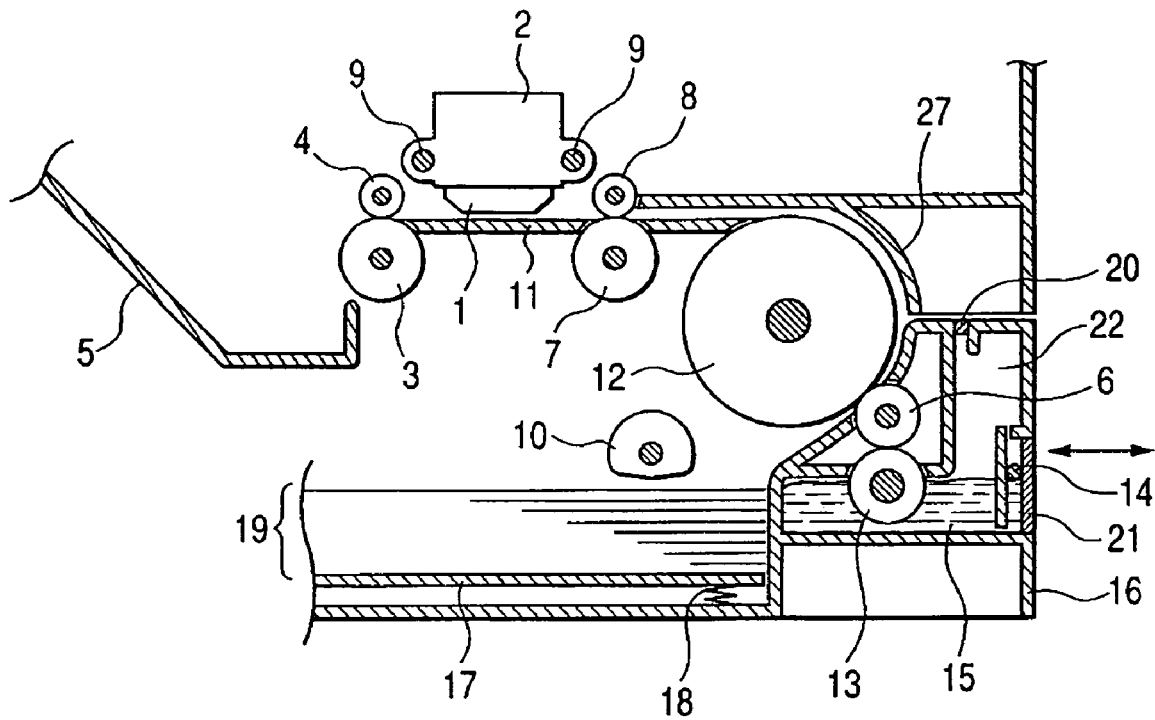
FIG. 1 is a sectional view showing an example of an ink-jet recording apparatus.

Hereinafter, the present invention will be described in more detail by way of preferred embodiments.

<Reaction Liquid>

The reaction liquid of the present invention is a reaction liquid to be used in combination with an ink comprising a coloring material in a dispersed state, and comprises a reactive substance that reacts with at least one component in the ink. The term "react" as used herein refers to the condition where aggregation or gelation is caused to take place when an ink and a reaction liquid are mixed with each other. In the present invention, in order to realize such function, a polyvalent metal compound having multiple reactive sites in one molecule is used.

For example, when an ink containing a resin-dispersed pigment as a coloring material and a reaction liquid are used to form an image, the shape of a pigment aggregate to be formed on a recording medium varies as follows depending on a reactive component in the reaction liquid. Description will be given of the case where the reactive component is only a polyvalent metal ion to be used for a conventional reaction liquid and the case where the reactive component is a polyvalent metal compound having multiple reactive sites in one molecule to be used in the present invention.

In general, a polyvalent metal ion to be frequently used for a conventional reaction liquid may be present as a monoatomic ion in an aqueous solution. Specific examples of the polyvalent metal ion include divalent metal ions such as $Ca_{2+}$, $Cu_{2+}$, $Ni_{2+}$, $Mg_{2+}$, $Zn_{2+}$, $Sr_{2+}$, and $Ba_{2+}$; and trivalent metal ions such as $Al_{3+}$, $Fe_{3+}$, $Cr_{3+}$, and $Y_{3+}$. When such polyvalent metal ion is used, a resin-dispersed pigment and a polyvalent metal ion react with each other at a ratio of approximately 1:1. In other words, one pigment particle (or one molecule of resin) reacts with approximately one polyvalent metal ion. As a result, individual pigment aggregates flocculate on a recording medium so as to be independent of each other to form an individual pigment aggregate. Therefore, at a region having a high image density, an image may be scratched when rubbed with a finger, a marker, or the like. In other words, scratch resistance and marker resistance may be insufficient.

On the other hand, when a polyvalent metal compound having multiple reactive sites in one molecule to be used in the present invention is used, the polyvalent metal compound having multiple reactive sites in one molecule reacts with multiple resin-dispersed pigments. As a result, bonding occurs in such a manner that the polyvalent metal compound having multiple reactive sites in one molecule and the resin-dispersed pigments link together (such reaction may hereinafter be referred to as a crosslinking reaction). As a result, multiple anionic compounds (resins) flocculate on a recording medium so as to entangle with each other to form an aggregate. Therefore, as compared to such individual pigment aggregate as described above in which individual pigment aggregates assemble so as to be independent of each other, that is, an individual aggregate in which the aggregates are merely assembled, strength against friction increases, and excellent scratch resistance and excellent marker resistance can be obtained even at a region having a high image density. As a result, excellent scratch resistance and excellent marker resistance that cannot be realized by a conventional reaction liquid containing a polyvalent metal ion can be obtained.

(Polyvalent Metal Compound Having Multiple Reactive Sites in One Molecule)

Examples of the polyvalent metal compound having multiple reactive sites in one molecule to be used for the reaction liquid according to the present invention include tetravalent metal compounds such as compounds containing elements belonging to the IVa group of the periodic table ("IV group" of the current periodic table) including zirconium salts (such as zirconium nitrate, zirconium sulfate, zirconium chloride, and zirconium acetate) and titanium salts (such as titanyl sulfate); and trivalent metal compounds including aluminum salts (such as polyaluminum chloride and polyaluminum hydroxide). Of those, zirconium salts and polyaluminum salts are preferable, and zirconium salts are particularly preferable because each of them has high crosslinkability for an anionic compound to provide excellent scratch resistance and excellent marker resistance. In addition, out of the zirconium salts, zirconium nitrate and zirconium acetate are more preferable because each of them is excellent in aggregability of a coloring material and in film formability. To cause such mechanism as described above to effectively occur to sufficiently provide the effects of the present invention, the polyvalent metal compound having multiple reactive sites in one molecule has preferably at least 3 or more (more preferably 5 or more) metal atoms in one molecule.

To be specific, any one of the following products can be used as the polyvalent metal compound having multiple reactive sites in one molecule to be used for the reaction liquid according to the present invention. Of course, the present invention is not limited thereto. For example, a Zircosol ZC-2 (zirconium chloride), a Zircosol ZS (zirconium sulfate), a Zircosol ZN (zirconium nitrate), or a Zircosol ZA (zirconium acetate) available from DAIICHI KIGENSO KAGAKU can be used as a zirconium salt. In addition, for example, a Paho #2S (polyaluminum hydroxide) or a PAC (polyaluminum chloride) available from ASADA KAGAKU KOGYO can be used as an aluminum compound.

Out of the polyvalent metal compounds each having multiple reactive sites in one molecule to be used in the present invention, zirconium salts and titanium salts are known to be present in such states as described below in aqueous solutions (reference document: Lee Inorganic Chemistry, 1982, TOKYO KAGAKU DOZIN, pp. 321 to 324). To be specific, the salts are not present as monoatomic ions such as $Zr_{4+}$ and $Ti_{4+}$. Instead, a $ZrO_{2+}$ ion and a $TiO_{2+}$ ion are present in the states of a $(ZrO_{2+})_n$ chain and a $(TiO_{2+})_n$ chain. That is, the salts are present to provide structures each containing multiple metal atoms in one molecule.

An example of the specific structures of the zirconium salts is shown in the following structural formula (1). As shown in the structural formula (1), Zr atoms are considered to form a hydroxy-crosslinked polymer in an aqueous solution so that a zirconium salt has multiple reactive sites (zirconium atoms) in one molecule.

Structural formula (1)

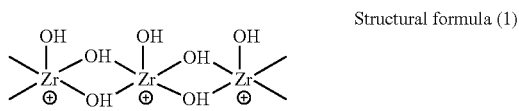

In addition, out of the polyvalent metal compounds each having multiple reactive sites in one molecule, a polyaluminum compound such as polyaluminum chloride or polyaluminum hydroxide is present in such a state as described below in an aqueous solution. To be specific, the compound is not present as a monoatomic ion such as $Al_{3+}$. Instead, at least part of the compound may be present in such a state as shown in the following structural formula (2) to have multiple reactive sites (aluminum atoms) in one molecule. In the polyaluminum compound, hydrated water in the structural formula (2) may desorb to prompt a crosslinking reaction between an anionic group in an anionic compound and each aluminum atom in one molecule of the polyaluminum compound.

Structural formula (2)

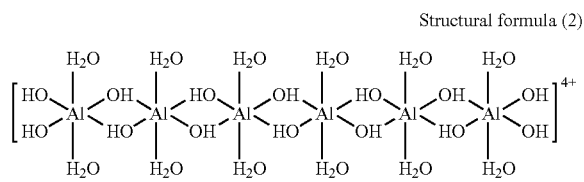

The content (mass %) of the polyvalent metal compound having multiple reactive sites in one molecule in the reaction liquid of the present invention is preferably 0.01 mass % or more and 30.0 mass % or less, more preferably 1.0 mass % or more and 20.0 mass % or less, or particularly preferably 3.0 mass % or more and 15.0 mass % or less on the basis of the total mass (in terms of a metal atom) of the reaction liquid. A content of less than 0.01 mass % may fail to provide the effects of the present invention. Although the content can be increased to exceed 30.0 mass %, a content in excess of 30.0 mass % is not so preferable because a tendency that the storage stability of the reaction liquid reduces and a tendency that the physical properties of the reaction liquid change upon long-term storage remarkably appear.

The polyvalent metal compound having multiple reactive sites in one molecule is in a solid state at normal temperature and normal humidity, that is, a crystalline state. Therefore, when water or a water-soluble organic solvent in the reaction liquid evaporates and hence the polyvalent metal compound having multiple reactive sites in one molecule are dried, the effects of the present invention are hardly obtained. As a result, the reaction liquid and ink need to be mixed with each other before the polyvalent metal compound having multiple reactive sites in one molecule in the reaction liquid becomes a crystal on a recording medium. That is, the ink and the reaction liquid need to be brought into contact and mixed with each other in a liquid state on the recording medium.

As typified by Japanese Patent Application Laid-Open No. H11-078211 and Japanese Patent Application Laid-Open No. 2003-312119, there has been conventionally a proposal concerning an ink or a reaction liquid containing a zirconium salt. However, no disclosure has been made heretofore with respect to the technical concept of the present invention in which anionic compounds (such as a polymer) are crosslinked in such a manner that a coloring material in ink is captured to form a coating film, thereby providing a high image density, excellent scratch resistance, and excellent marker resistance.

In addition, the polyvalent metal compound having multiple reactive sites in one molecule to be used for the reaction liquid of the present invention is often incorporated as a component constituting an ink-receiving layer of a recording medium such as glossy paper. However, when the polyvalent metal compound to be used for the reaction liquid of the present invention is incorporated as a component of a recording medium, and the polyvalent metal compound is in a crystalline state since the recording medium is dried once in its production process. Therefore, the polyvalent metal compound has no function of crosslinking the components in ink. In other words, the effects of the present invention cannot be obtained when the polyvalent metal compound to be used for the reaction liquid of the present invention is incorporated into a recording medium.

(Other Polyvalent Metal Ions or Salts Thereof)

The reaction liquid according to the present invention can contain any other polyvalent metal ion or a salt thereof in addition to the polyvalent metal compound having multiple reactive sites in one molecule for the purpose of helping an image density and any other performance. As described above, the polyvalent metal compound having multiple reactive sites in one molecule is excellent in ability to improve scratch resistance and marker resistance. However, in the case where only the polyvalent metal compound having multiple reactive sites in one molecule is used in a large amount, a high image density is hardly obtained as compared to the case where any other polyvalent metal ion is used in a large amount. On the other hand, when only the other polyvalent metal ion is used, a considerably high image density can be easily obtained by increasing the content of the ion in the reaction liquid, but scratch resistance and marker resistance deteriorate. In other words, when only the other polyvalent metal ion is used, it is difficult to simultaneously achieve high image density, excellent scratch resistance, and excellent marker resistance. In view of the foregoing, the inventors of the present invention have made extensive studies. As a result, they have found that the combined use of the polyvalent metal compound having multiple reactive sites in one molecule and any other polyvalent metal ion exerts a synergistic effect in achieving compatibility among an image density, scratch resistance, and marker resistance.

Specific examples of the other polyvalent metal ion that can be used for the reaction liquid according to the present invention (that is, a polyvalent metal ion except the polyvalent metal compound having multiple reactive sites in one molecule) include divalent metal ions such as $Ca_{2+}$, $Cu_{2+}$, $Ni_{2+}$, $Mg_{2+}$, $Zn_{2+}$, $Sr_{2+}$, and $Ba_{2+}$; and trivalent metal ions such as $Al_{3+}$, $Fe_{3+}$, $Cr_{3+}$, and $Y_{3+}$. Of course, the present invention is not limited to them. The term "salt of the other polyvalent metal ion" refers to a metal salt composed of such other polyvalent metal ion as described above and an anion capable of binding to the ion, and the metal salt needs to be water-soluble. Specific examples of the anion for forming a salt include $Cl_-$, $NO_{3-}$, $I_-$, $Br_-$, $ClO_{3-}$, $NO_{2-}$, $SO_{42-}$, $CO_{32-}$, $CH_3COO_-$, and $HCOO_-$. Of course, the present invention is not limited to them. Of those, the polyvalent metal ion is preferably $Ca_{2+}$, $Mg_{2+}$, $Sr_{2+}$, $Al_{3+}$, or $Y_{3+}$, or more preferably $Ca_{2+}$ from the viewpoints of, for example, reactivity with ink and ease of handling. The anion is particularly preferably $NO_3-$ from the viewpoint of, for example, solubility in water.

The content (mass %) of the other polyvalent metal ion in the reaction liquid of the present invention is preferably 0.01 mass % or more and 10.0 mass % or less, more preferably 1.0 mass % or more and 5.0 mass % or less, or particularly preferably 2.0 mass % or more and 4.0 mass % or less on the basis of the total mass (in terms of a metal atom) of the reaction liquid. Although the content can be increased to exceed 10.0 mass %, there is usually no need to incorporate an excessive amount of the ion partly because a significant increase in function to destabilize inks cannot be expected from a content in excess of 10.0 mass %.

(Other Components)

The reaction liquid according to the present invention is typically prepared by incorporating the above components into an aqueous medium. In addition to the components, a pH buffer and a surfactant can be incorporated. Hereinafter, they will be described.

[Aqueous Medium]

The reaction liquid of the present invention is prepared by dissolving or dispersing such components as described above into an aqueous medium. Water or a mixed solvent of water and a water-soluble organic solvent is typically used as the aqueous medium. A water-soluble organic solvent having a preventing effect on the drying of the reaction liquid is particularly preferable. Specific examples thereof include alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols each containing an alkylene group having 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; N-methyl-2-pyrrolidone; 2-pyrrolidone; and 1,3-dimethyl-2-imidazolidinone.

Each of the above water-soluble organic solvents may be used alone, or two or more of them may be used as a mixture. In addition, deionized water is preferably used as water. Although the content (mass %) of the water-soluble organic solvent is not particularly limited, the content is preferably 5.0 mass % to 70.0 mass % on the basis of the total mass of the reaction liquid. In addition, the water content (mass %) is preferably 25.0 mass % to 95.0 mass % on the basis of the total mass of the reaction liquid. In the present invention, details about the kind and content of the water-soluble organic solvent are preferably determined in consideration of, for example, compatibility with a polyvalent metal compound and the stability of the reaction liquid when water evaporates.

[pH Buffer]

Some of the polyvalent metal compounds to be used in the present invention may originally have low pH values or reduce their pH values owing to long-term storage. When a problem arises in this respect, the addition of, for example, a pH buffer in a weak acid to neutral region to the reaction liquid is preferable in terms of the stability of the reaction liquid. Specific examples of an available pH buffer include acetates such as sodium acetate, potassium acetate, and lithium acetate; and hydrogen salts of polycarboxylic acids such as a hydrogen phosphate, a hydrogen carbonate, sodium hydrogen phthalate, and potassium hydrogen phthalate. Specific examples of the polycarboxylic acids include phthalic acid, malonic acid, maleic acid, succinic acid, fumaric acid, itaconic acid, isophthalic acid, terephthalic acid, adipic acid, sebacic acid, dimer acid, pyromellitic acid, and trimellitic acid. The content (mass %) of the pH buffer is preferably 0.01 mass % or more and 10 mass % or less on the basis of the total mass of the reaction liquid. Any other conventionally known compounds expressing a buffer action on pH than the substances listed above can be used in the present invention as long as the addition of the compound can maintain the pH of the reaction liquid in a preferable pH range. Of those, an acetate is particularly preferably used as a pH buffer partly because it shows a buffer action at preferable pH in the present invention and can be easily handled. The pH of the reaction liquid of the present invention is preferably 3 or more and 8 or less, or more preferably 5 or more and 7 or less.

[Surfactant]

The reaction liquid according to the present invention may contain a surfactant. Specific examples of a surfactant that can be added to the reaction liquid of the present invention include anionic surfactants such as fatty acid salts, higher alcohol sulfates, liquid fatty acid sulfates, and alkylallyl sulfonates; and nonionic surfactants such as polyoxyethylene alkyl ethers, polyoxyethylene alkyl esters, polyoxyethylene sorbitan alkyl esters, acetylene alcohol, and acetylene glycol.

One or two or more kinds of those surfactants may be appropriately selected and used. The content (mass %) of the surfactant is preferably 0.01 mass % or more and 10.0 mass % or less on the basis of the total mass of the reaction liquid, although the content varies depending on, for example, a polymer compound to be incorporated.

[Additive]

The reaction liquid of the present invention can appropriately contain a defoaming agent, an antifungus agent, an antiseptic, or the like as required as well as the above components for providing desired physical property values.

The reaction liquid of the present invention having such constitution as described above is used in combination with ink upon formation of an image. Therefore, the reaction liquid is preferably colorless showing no absorption in a visible range in consideration of an influence on the image. However, the present invention is not necessarily limited thereto. A pale reaction liquid showing absorption in a visible range is also available as long as it does not affect an actual image.

<Ink>

The reaction liquid of the present invention is used in combination with ink upon formation of an image. An example of inks that can be suitably used in the present invention includes pigment inks containing, as a coloring material, a pigment (in the present invention, a micro-encapsulated pigment, a colored resin, and the like are included in the category of the pigment) in a dispersed state. Examples of the dispersion type of the pigment include a self-dispersible pigment the surface of which has an anionic group chemically bound thereto and a resin-dispersed pigment in which dispersion is achieved by an anionic dispersant. In the present invention, pigment ink using a resin-dispersed pigment out of those is particularly preferably used from the viewpoint of obtaining a high image density, excellent scratch resistance, and excellent marker resistance. Hereinafter, components constituting the ink such as a coloring material and an aqueous medium will be described in detail.

(Coloring Material)

Examples of a coloring material that can be used for the ink according to the present invention include carbon black and pigments such as an organic pigment. The content (mass %) of the coloring material has only to be appropriately selected in such a manner that the ink provides excellent ink-jet ejection property when used for ink-jet recording and has a desired color tone and a desired density. As a guideline, the content is preferably, for example, 0.1 mass % to 15.0 mass % on the basis of the total mass of the ink.

[Carbon Black]

For example, carbon black such as furnace black, lamp black, acetylene black, or channel black can be used. Specific examples of available carbon black include Raven 1170, Raven 1190 ULTRA-II, Raven 1200, Raven 1250, Raven 1255, Raven 1500, Raven 2000, Raven 3500, Raven 5000, Raven 5250, Raven 5750, and Raven 7000 (manufactured by Columbian Chemicals Co.); Mogul L (manufactured by Cablack Co.); Black Pearls L, Regal 330R, Regal 400R, Regal 660R, Monarch 700, Monarch 800, Monarch 880, Monarch 900, Monarch 1000, Monarch 1100, Monarch 1300, Monarch 1400, and Valcan XC-72R (manufactured by Cabot Co.); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 4, Special Black 4A, and Special Black 5 (manufactured by Degussa Corporation); and No. 25, No. 33, No. 40, No. 47, No. 52, No. 900, No. 2300, MCF-88, MA7, MA8, MA100, and MA600 (manufactured by Mitsubishi Chemical Corporation).

Of course, the present invention is not limited to them. Any conventionally known carbon black can be used. Magnetic fine particles made of magnetite, ferrite, or the like, titanium black, or the like may be used as the black pigment.

[Organic Pigment]

Specific examples of an available organic pigment include insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; flavanthrone yellow; acylamide yellow; quinophthalone yellow; nickel azo yellow; copper azo methine yellow; perinone orange; anthrone orange; dianthraquinonyl red; and dioxazine violet.

Further, examples of the organic pigment represented by a color index (C.I.) number include the following. Of course, the present invention is not limited to them. Any conventionally known organic pigment can be used.

C.I. Pigment Yellow 12, 13, 14, 17, 20, 24, 74, 83, 86, 93, 109, 110, 117, 120, 125, 128, 137, 138, 147, 148, 151, 153, 154, 166, and 168

C.I. Pigment Orange 16, 36, 43, 51, 55, 59, and 61

C.I. Pigment Red 9, 48, 49, 52, 53, 57, 97, 122, 123, 149, 150, 168, 175, 176, 177, 180, 192, 215, 216, 217, 220, 223, 224, 226, 227, 228, 238, and 240

C.I. Pigment Violet 19, 23, 29, 30, 37, 40, and 50

C.I. Pigment Blue 15, 15:1, 15:3, 15:4, 15:6, 22, 60, and 64

C.I. Pigment Green 7 and 36

C.I. Pigment Brown 23, 25, and 26

(Dispersant and Polymer)

When any one of carbon black and the organic pigments described above is used as a coloring material of the ink, a dispersant for dispersing the coloring material needs to be used in combination with the coloring material. To obtain the effects of the present invention, the dispersant needs to be an anionic compound having a functional group capable of stably dispersing the coloring material by the action of an anionic group and causing a crosslinking reaction by contacting and mixing with a polyvalent metal compound in a reaction liquid, which functional group is an anionic group such as a carboxyl group, a hydroxyl group, or an amide group.

An anionic polymer can be exemplified as a dispersant which satisfies the above conditions and can be used for ink, and specific examples thereof include a styrene-acrylic acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-maleic acid half ester copolymer, a vinyl naphthalene-acrylic acid copolymer, a vinyl naphthalene-maleic acid copolymer, a styrene-maleic anhydride-maleic acid half ester copolymer, and salts of them.

The weight average molecular weight of each of those dispersants is preferably 1,000 or more and 30,000 or less, or more preferably 3,000 or more and 15,000 or less. The content (mass %) of the dispersant is preferably 5% or more and 300% or less in mass ratio with respect to the pigment in the ink. A mass ratio of less than 5% may destabilize dispersion or may fail to provide sufficient strength for a coating film generated by a reaction with the polyvalent metal compound of the present invention. On the other hand, a mass ratio in excess of 300% is not preferable because the viscosity of the ink becomes extremely high.

In addition, a microencapsulated pigment has dispersibility into an aqueous medium. To additionally improve dispersion stability, such anionic dispersant as described above may be coexistent in the ink. When a colored fine particle is used as a coloring material, the above described anionic dispersant is preferably used. A pigment having self-dispersibility can also be used in the present invention. The ink according to the present invention needs to contain at least one component that reacts with a polyvalent metal compound having multiple reactive sites in one molecule contained in the reaction liquid. In this case, however, the ink needs to contain at least one kind of anionic polymer component having crosslinkability with a polyvalent metal compound.

In addition to a pigment dispersant, a nonionic polymer may be further incorporated into the ink for the purpose of additionally improving the scratch resistance and marker resistance of a formed image. Most of the nonionic polymers described later have hydroxyl groups in their molecules. Therefore, incorporating each of them into the ink so that each of them is used for a set with the reaction liquid of the present invention enables the coloring material in the ink to be captured by a coating film with improved strength. Specific examples of the nonionic polymer include polyvinyl alcohol, a polyvinyl alcohol derivative, polyvinyl acetal, a polyvinyl acetal derivative, polyvinyl ether, a polyvinyl ether derivative, polyvinyl pyrrolidone, a polyvinyl pyrrolidone derivative, carboxymethylcellulose, hydroxymethylcellulose, and hydroxypropylcellulose.

Of those, polyvinyl alcohol is particularly preferable from the viewpoint of improving scratch resistance and marker resistance. The weight average molecular weight of each of those nonionic polymers is preferably 1,000 or more and 30,000 or less, or more preferably 3,000 or more and 15,000 or less. The content (mass %) of the nonionic polymer is preferably 0.1 mass % or more and 5.0 mass % or less, or more preferably 0.5 mass % or more and 2.0 mass % or less on the basis of the total mass of the ink.

(Aqueous Medium)

The aqueous medium into which such pigment as described above is dispersed is not particularly limited, and the same aqueous medium as that used for the reaction liquid can be used. In addition, when the ink to be used in the present invention is caused to adhere to a recording medium by means of an ink-jet method (such as a bubble jet method), the components of the aqueous medium are preferably adjusted to provide excellent ink-jet ejection property and to provide the ink with desired viscosity and desired surface tension. For example, water or a mixed solvent of water and a water-soluble organic solvent is used as the aqueous medium that can be used for the ink to be used in the present invention. A water-soluble organic solvent having a preventing effect on the drying of the ink is particularly preferable. Specific examples thereof include alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols each containing an alkylene group having 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; N-methyl-2-pyrrolidone; 2-pyrrolidone; and 1,3-dimethyl-2-imidazolidinone.

Each of the above water-soluble organic solvents may be used alone, or two or more of them may be used as a mixture. In addition, deionized water is preferably used as water. Although the content (mass %) of the water-soluble organic solvent is not particularly limited, the content is preferably 3.0 mass % to 50.0 mass % on the basis of the total mass of the ink. In addition, the water content (mass %) is preferably 50.0 mass % to 95.0 mass % on the basis of the total mass of the ink.

[Additive]

Of course, to the ink of the present invention may be added a humectant as required as well as the above components. In addition, to the ink of the present invention may be added a defoaming agent, an antifungus agent, an antiseptic, or the like to provide desired physical property values.

<Set of Ink and Reaction Liquid>

When the reaction liquid and the ink described above are combined to provide a set of an ink and a reaction liquid, the color tone of the ink is not particularly limited, and the ink has only to show one color tone selected from, for example, yellow, magenta, cyan, red, green, blue, and black. To be specific, the above-described coloring materials can be appropriately selected and used to provide an ink having a desired color tone. The number of inks to be combined with the reaction liquid is not limited to one, and two or more inks having different colors are more preferably combined to provide an ink set suitable for the formation of a multi-color image. In this case, at least one ink of the two or more inks has only to react with the reaction liquid.

For example, when a coloring material is present in a dispersed state in one ink by at least one kind of anionic polymer, any other ink may contain a dye as a coloring material. Of course, each of all inks may be an ink prepared by dispersing a coloring material into an aqueous medium by virtue of an action of an ionic group. The use of a set of an ink and a reaction liquid of the present invention having such constitution can suppress bleeding occurring when inks having different color tones are applied so as to be adjacent to each other on a recording medium, the bleeding being of concern when a multi-color image is to be formed by means of an ink-jet apparatus. More specifically, the bleeding which is of concern in an ink-jet multi-color image is apt to be particularly remarkable between a black ink and any other color ink (for example, at least one ink selected from yellow ink, magenta ink, cyan ink, red ink, green ink, and blue ink). Therefore, for example, a black ink having a coloring material present therein in a dispersed state by at least one kind of anionic polymer is preferably combined as the ink to be destabilized by the reaction liquid according to the present invention. Any other ink may be an ink prepared by dissolving a dye into an aqueous medium. Of course, each of all the other inks may be an ink having a coloring material present therein in a dispersed state by at least one kind of anionic polymer as in the case of the above-described black ink so that each of them is destabilized by the reaction liquid according to the present invention.

(Flocculation Value)

The inventors of the present invention have made extensive studies. As a result, they have found that when an image is to be formed by means of the set of an ink and a reaction liquid of the present invention, the combination of an ink and a reaction liquid particularly preferably satisfies the specific range of flocculation value determined by the following condition because an additionally high image density can be obtained.

To be specific, 5 g of a reaction liquid 100-times diluted with water are charged into a vessel having an inner diameter of 10 mm, 0.25 g of an ink is added dropwise to the vessel, and the whole is left standing for 60 minutes. After that, the ratio of the height of an aggregate to the height from the bottom surface of the vessel to a liquid level is determined. The determined value is taken as the definition of the flocculation value of the ink with respect to the reaction liquid.

In the present invention, the reactivity between the ink and the reaction liquid is preferably adjusted in such a manner that the flocculation value determined by means of the above method is less than 0.5, or more preferably less than 0.4. Furthermore, in order to obtain a particularly high image density, the flocculation value is preferably less than 0.3.

<Image Recording Method and Ink-jet Recording Apparatus>

The reaction liquid according to the present invention contains, as a substance that reacts with at least one component in ink, a polyvalent metal compound having multiple reactive sites in one molecule, and is used in combination with an ink destabilized by the reaction liquid to form an image. A recording method involving performing at least recording with ink by means of an ink-jet recording system is a suitable image recording method at that time. More specifically, the image recording method includes the steps of: (i) applying an ink to a recording medium by means of an ink-jet system; and (ii)

applying the reaction liquid at least to a region of the recording medium where the ink is applied, and the steps (i) and (ii) are each performed in such a manner that the reaction liquid according to the present invention and the above-described ink contact with each other on the recording medium to form an image. The step (i) may be performed before or after the step (ii).

Thus, the ink aggregates or gels on the recording medium by virtue of the reaction liquid according to the present invention. As a result, excellent scratch resistance and excellent marker resistance are realized even at a region having a high image density such as a solid print portion as compared to the case where a conventional reaction liquid containing a polyvalent metal ion is used. Furthermore, no color bleeding occurs. In addition, a high quality image having reduced strike-through of a coloring material toward a printing back surface; a high density; and high coloring property can be stably obtained.

Examples of the method of applying the reaction liquid according to the present invention to the recording medium in the foregoing description include a method involving the use of an ink-jet recording system as in the case of ink and a method involving applying the reaction liquid to the recording medium by means of a roller or the like. In the present invention, application by means of a roller or the like is preferable because such application eliminates the need for taking ejection property and the like into consideration. Meanwhile, the ink and the reaction liquid can be applied together to the recording medium by means of an ink-jet recording system. In this case, the order in which the ink and the reaction liquid are applied to the recording medium is not limited, and any one of the methods including the following methods (a) to (d) may be used.

(a) applying an ink after applying a reaction liquid.
(b) applying a reaction liquid after applying an ink.
(c) applying a reaction liquid after applying an ink, and then applying the ink again.
(d) applying an ink after applying a reaction liquid, and then applying the reaction liquid again.

In view of the object of the present invention, the method (a) or (d) including the step of applying the ink after the application of the reaction liquid is preferable because a polymer present in the ink can be effectively aggregated and formed into a film near the surface of the recording medium.

In the present invention, the ink and the reaction liquid each in a liquid state need to contact with each other on the recording medium. To this end, the ink needs to be applied immediately after the application of the reaction liquid when the ink is applied after the application of the reaction liquid. The time period from the application of the reaction liquid to the application of the ink is preferably 1 minute or less when the application by means of ink-jet recording method, or more preferably 30 seconds or less when the application by means of a roller or the like.

The amount of the reaction liquid to be applied to the recording medium can be appropriately adjusted depending on the kind and content of the polyvalent metal compound in the reaction liquid or on the ink to react with the polyvalent metal compound. To be specific, the amount of the reaction liquid to be applied is preferably 0.5 $g/m_2$ or more and 10 $g/m_2$ or less from the viewpoints of, for example, the solid print uniformity and fixability of an image on a recorded article to be obtained. The amount is more preferably 2 $g/m_2$ or more and 5 $g/m_2$ or less. In addition, examples of a recording medium to be used in the image recording method of the present invention include plain paper and coated paper, and plain paper is particularly preferably used as the recording medium because the effects of the present invention can be significantly obtained.

(Ink-jet Recording Apparatus)

Next, an example of an ink-jet recording apparatus suitable for the present invention will be described below. FIG. 1 shows a partial sectional view of an example of an ink-jet recording apparatus suitable for the image recording method according to the present invention and having means for applying a reaction liquid by means of a roller. The ink-jet recording apparatus employs a serial-type ink-jet recording system and includes a recording head 1; a sheet-feeding cassette 16 having a sheet-feeding tray 17 for feeding a recording medium (which may hereinafter be referred to as recording paper) 19 and means for applying the reaction liquid of the present invention, the tray and the means being integrally formed; drive means for allowing the recording head to move back and forth in the direction (main scanning direction) perpendicular to the direction in which the recording paper is conveyed (sub-scanning direction) (hereinafter, the direction in which the recording paper is conveyed is referred to as the conveying direction); and control means for controlling the drive of these components.

The recording head 1 is mounted on a carriage 2 in such a manner that a surface having ink ejection orifices formed thereon faces a platen 11. Although not shown, the recording head 1 includes the ink ejection orifices; multiple electrothermal converting elements (such as heat elements) to heat an ink liquid; and a substrate supporting them. The recording head 1 has an ink cartridge installed in a carriage placed in the upper part thereof.

The carriage 2 has the recording head 1 mounted thereon, and can move back and forth along two guide shafts 9 extending in parallel along the width direction of the recording paper 19. In addition, the recording head 1 is driven to eject ink droplets to the recording paper 19 in synchronization with the reciprocating motion of the carriage 2 to form an image.

The sheet-feeding cassette 16 is detachable from the main body of the ink-jet recording apparatus. The sheets of the recording paper 19 are stacked on the sheet-feeding tray 17 in the sheet-feeding cassette 16. During sheet feeding, the uppermost recording paper 19 is pressed against a sheet-feeding roller 10 by a spring 18 for pressing the sheet-feeding tray 17 upward. The sheet-feeding roller 10 has an almost semicircle cross-section, and is rotated by a motor (not shown) to feed only the uppermost recording paper 19 with a separation claw (not shown).

The separately fed recording paper 19 is conveyed along a convey surface 16A of the sheet-feeding cassette 16 and a convey surface 27A of a paper guide 27 by a large diameter intermediate roller 12 and a small diameter application roller 6 pressed against the intermediate roller 12. Those convey surfaces are curved in an arc concentric with the intermediate roller 12. Thus, the fed recording paper 19 passes along those convey surfaces 16A and 27A to reverse its conveying direction. That is, the printing surface of the recording paper 19 faces downward until the recording paper 19 is conveyed from the sheet-feeding tray 17 and reaches the intermediate roller 12, but faces upward (recording head side) when the recording paper 19 faces the recording head 1. Thus, the printing surface of the recording paper always faces outward from the image forming apparatus.

The means for applying the reaction liquid according to the present invention is arranged in the sheet-feeding cassette 16 in the exemplified apparatus, and includes a supply tank 22 for supplying a reaction liquid 15; a supply roller 13 rotatably supported with its circumferential surface partly immersed in the supply tank 22; and the application roller 6 arranged in parallel to and in contact with the supply roller 13 to rotate in the same direction. Further, the application roller 6 is arranged in such a manner that its circumferential surface is in contact with and in parallel to the intermediate roller 12 that conveys the recording paper 19. Thus, when the recording paper 19 is conveyed, the intermediate roller 12 and the application roller 6 rotate in association with the rotation of the intermediate roller 12. As a result, the reaction liquid 15 is supplied to the circumferential surface of the application roller 6 by the supply roller 13, and the reaction liquid 15 is applied uniformly by the application roller 6 to the printing surface of the recording paper 19 sandwiched between the application roller 6 and the intermediate roller 12.

This ink-jet recording apparatus is provided with a float 14 in the supply tank 22. The float 14 is formed of a substance having a smaller specific gravity than that of the reaction liquid 15, and floats on the surface of the reaction liquid, thereby allowing one to visually observe the remaining amount of the reaction liquid 15 from the outside through a remaining amount display window 21 formed of a transparent member.

Figure 2:
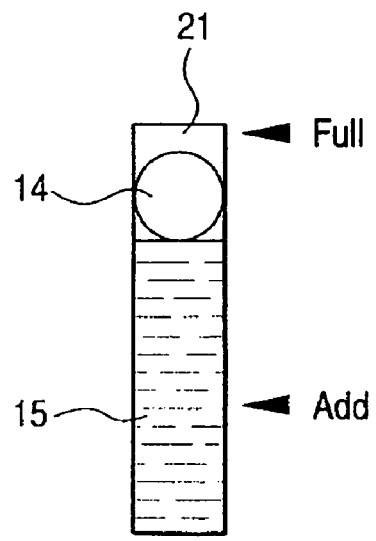
FIG. 2 is a front view of a remaining amount display portion of the ink-jet recording apparatus of FIG. 1.

FIG. 2 is a front view of the remaining amount display portion. The remaining amount display portion is provided with an indicator indicating a level of the remaining amount along the longitudinal direction of the remaining amount display window 21. In the figure, the tank is full with the reaction liquid when the surface of the reaction liquid 15 or the float 14 reaches the position marked "Full". In contrast, the surface of the reaction liquid 15 or the float 14 at the position marked "Add" indicates that the remaining amount of the reaction liquid is small. Thus, observation makes it very clear that the reaction liquid should be supplied when the level of the reaction liquid 15 gradually drops and the float 14 reaches the Add line.

Figure 3:
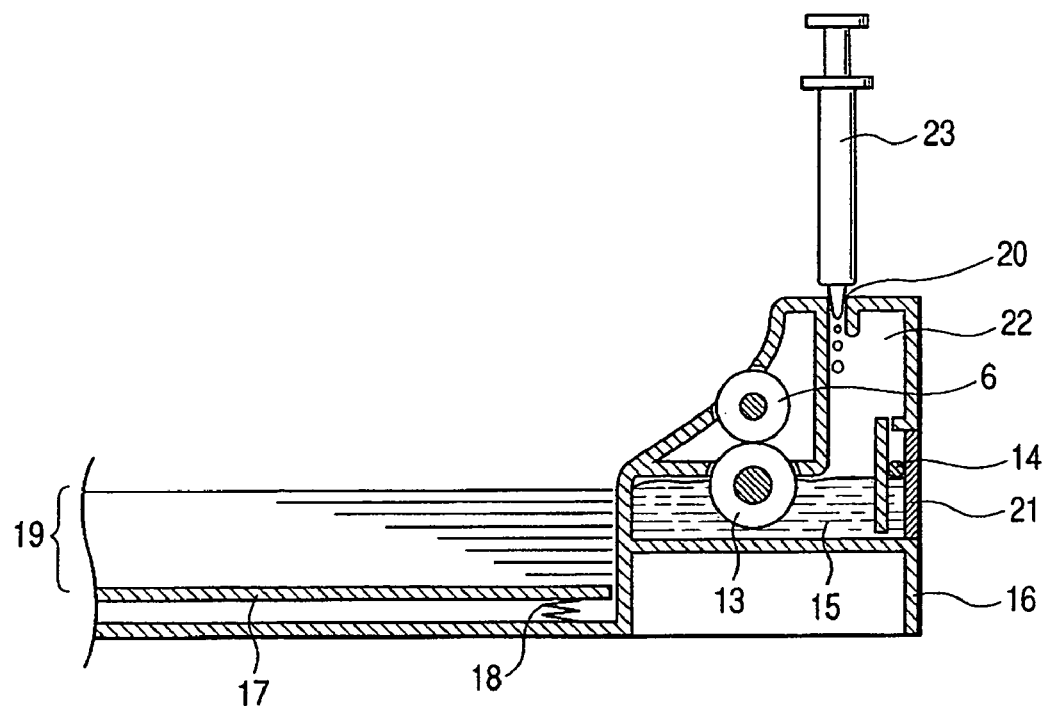
FIG. 3 is a view for explaining a method of replenishing the ink-jet recording apparatus of FIG. 1 with a reaction liquid.

FIG. 3 describes the method of supplying the reaction liquid 15. That is, the sheet-feeding cassette 16 is pulled out of the main body of the ink-jet recording apparatus, and the tip of an injector 23 is inserted into an inlet 20 made of a rubber member having a slit to inject the reaction liquid 15 into the supply tank 22.

As described above, the recording paper 19 having the reaction liquid 15 applied thereto is then conveyed at a certain speed by a main conveying roller 7 and a pinch roller 8 pressed against the main conveying roller 7 to reach a recording part, where the ink is applied to the recording paper 19 from the recording head 1. The recording paper 19 fed and printed in the configuration described above is discharged and conveyed by a sheet-discharge roller 3 and a spur 4 pressed against the sheet-discharge roller 3, and is then stacked on a sheet-discharge tray 5.

When a reaction liquid is applied by means of a roller or the like, the viscosity of the reaction liquid is particularly preferably higher than that of the ink because the ink can be effectively destabilized even with a small amount of the reaction liquid to be applied and the fixability or the like of a recorded article becomes good. More specifically, when the viscosity of the reaction liquid is high, a polyvalent metal compound to be used in the present invention is more likely to remain near the surface of a recording medium, and hence readily reacts with the ink.

Meanwhile, after the ink has reacted with the reaction liquid, a coloring material component in the ink remains near the surface of the recording medium so that a water-soluble organic solvent, water, and the like quickly penetrate into the recording medium. That is, solid-liquid separation is preferably performed quickly. Therefore, the viscosity of the reaction liquid is preferably as low as possible from the viewpoint of the fixability of a recorded article. The viscosity of the reaction liquid to be applied by means of a roller or the like is adjusted to be preferably 3 mpa·s or more and 100 mpa·s or less, or more preferably 5 mpa·s or more and 60 mpa·s or less. The viscosity of the reaction liquid or the ink in the present invention is measured according to an ordinary method in an environment having a temperature of 25° C.

Figure 4:
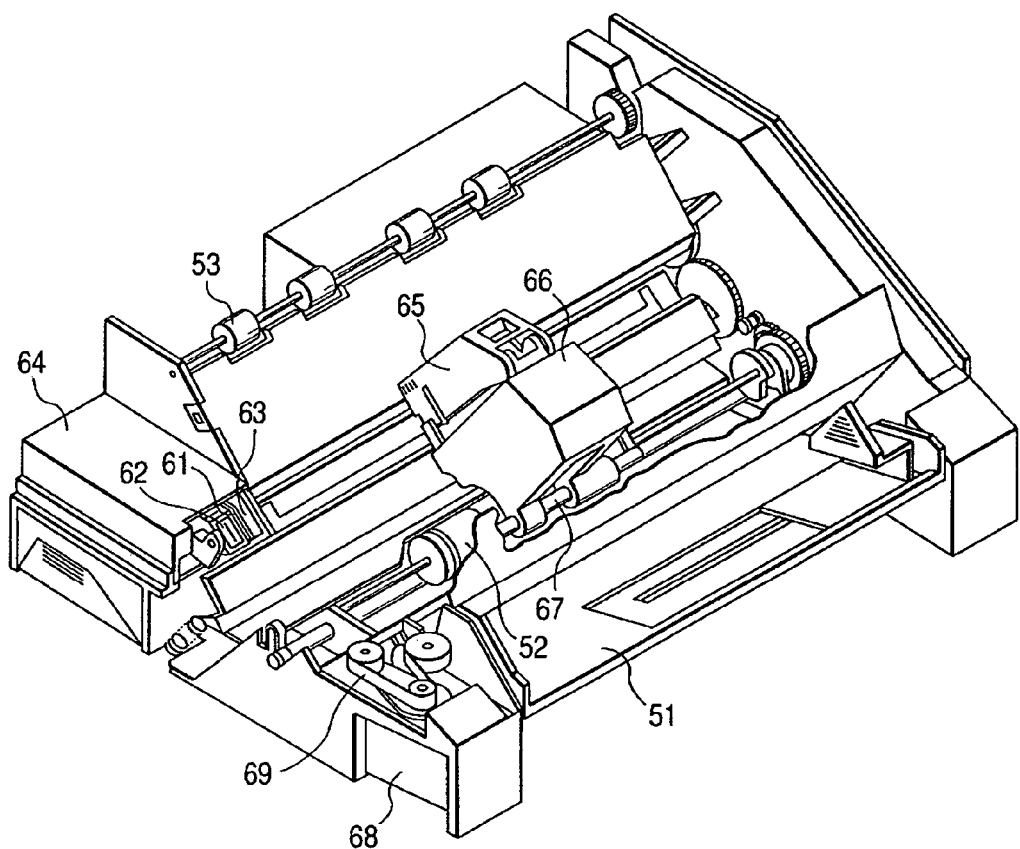
FIG. 4 is a schematic perspective view showing an example of an ink-jet recording apparatus.

FIG. 4 shows another example of an ink-jet recording apparatus. In FIG. 4, reference numeral 61 denotes a blade as a wiping member, one end of which is held and fixed by a blade holding member to form a cantilever. The blade 61 is placed at a position adjacent to a recording region provided by a recording head 65. In this example, the blade 61 is held so as to extrude in the moving path of the recording head 65.

Reference numeral 62 denotes a cap of the surface of the extruding port of the recording head 65. The cap 62 is placed at a home position adjacent to the blade 61. The cap 62 moves in the direction perpendicular to the moving direction of the recording head 65 to be in contact with an ink ejection orifice surface to thereby perform capping. Reference numeral 63 denotes an ink absorbent arranged so as to be adjacent to the blade 61. As in the case of the blade 61, the ink absorbent 63 is held so as to extrude in the moving path of the recording head 65. The blade 61, the cap 62, and the ink absorbent 63 constitute an ejection recovery portion 64. Moisture content, dust, and the like on the ejection orifice surface are removed by the blade 61 and the ink absorbent 63. A recovery unit is also constituted, in which each ink of the recording head, ink placed at an ejection orifice for the reaction liquid, and the like are sucked by a pump (not shown) via the cap to recover the expected ejection performance of the ink, or the ink and the reaction liquid, for the recording head.

Reference numeral 65 denotes the recording head for performing recording by ejecting ink to a recording medium opposed to an ejection orifice surface provided with an ejection orifice, the recording head having ejection energy generating means. Reference numeral 66 denotes a carriage for moving the recording head 65 mounted thereon. The carriage 66 is slidably engaged with a guide shaft 67, and part of the carriage 66 is connected (not shown) to a belt 69 driven by a motor 68. Thus, the carriage 66 can move along the guide shaft 67. The carriage 66 can move in the recording region provided by the recording head 65 and a region adjacent to the recording region. Reference numeral 51 denotes a sheet-feeding portion into which a recording medium is inserted, and reference numeral 52 denotes a sheet-feeding roller to be driven by a motor (not shown).

With such constitution, the recording medium is fed to a position opposed to the ejection orifice surface of the recording head 65. As recording proceeds, the recording medium is discharged to a sheet-discharge portion equipped with a sheet-discharge roller 53. In the above constitution, when the recording head 65 returns to its home position after the completion of the recording, the cap 62 of the ejection recovery portion 64 evacuates from the moving path of the recording head 65, while the blade 61 extrudes in the moving path. As a result, the ejection orifice of the recording head 65 is wiped. When the cap 62 contacts with the ejection orifice surface of the recording head 65 to perform capping, the cap 62 moves to extrude in the moving path of the recording head. When the recording head 65 moves from its home position to a recording starting position, the cap 62 and the blade 61 are each placed at the same position as that at the time of wiping. As a result, the ejection orifice surface of the recording head 65 is also wiped through this movement.

The above-described movement of the recording head to its home position occurs upon completion of the recording and at the time of ejection recovery. In addition, while the recording head moves in the recording region for recording, the recording head moves to its home position adjacent to the recording region at a predetermined interval. In association with the movement, the above wiping is performed.

<Ink Properties; Ink-jet Ejection Property, Penetrability into Recording Medium>

Examples of an ink-jet recording method that can be employed for the image recording method according to the present invention include a recording method involving applying mechanical energy to an ink to eject a liquid droplet and a recording method involving applying thermal energy to ink to eject a liquid droplet by virtue of the bubbling of the ink. Those recording methods are applicable not only to the ink as described above but also to a reaction liquid. When the methods are applied to a reaction liquid, the reaction liquid and the ink constituting the ink set according to the present invention preferably have properties with which they can be ejected from a recording head. Those liquids each preferably have properties including a viscosity of 1 to 15 mpa·s (more preferably 1 to 5 mpa·s) and a surface tension of 25 mN/m (dyne/cm) or more (more preferably 25 to 50 mN/m (dyne/cm)) from the viewpoint of ejection property from a recording head. Furthermore, the reaction liquid according to the present invention needs to be caused to react with only an ink on a recording medium such as a paper surface. Therefore, the surface tension of the reaction liquid is preferably set to be higher than that of the ink to be destabilized by the reaction liquid to the extent that the reaction liquid can be ejected from a recording head.

(Ink Cartridge)

Figure 5:
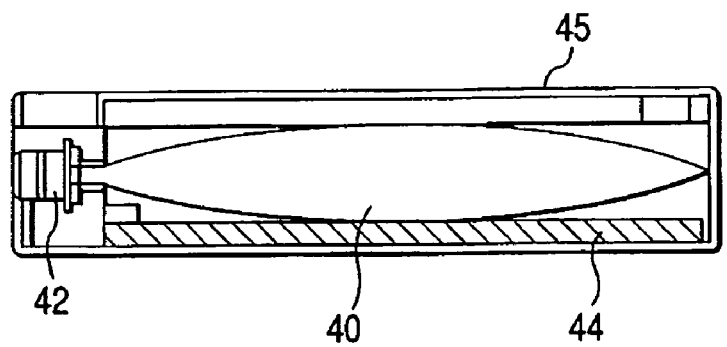
FIG. 5 is a vertical sectional view showing an example of an ink cartridge.
Figure 6:
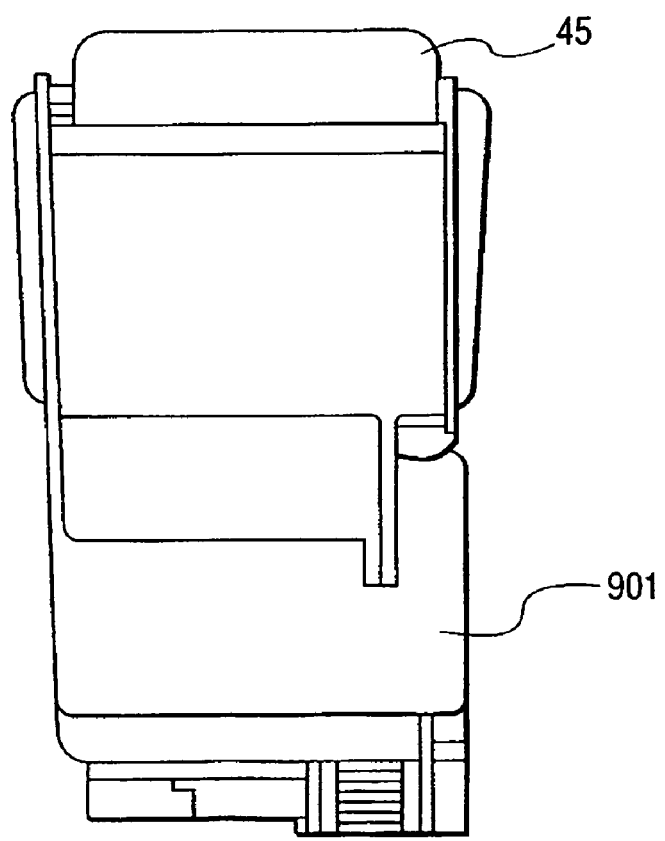
FIG. 6 is a schematic view showing a recording head having mounted thereon an ink cartridge.

FIG. 5 shows an example of a member for supplying an ink or a reaction liquid to a recording head, for example, a cartridge 45 storing an ink or a reaction liquid to be supplied via a tube. Here, reference numeral 40 denotes a storage portion storing an ink or a reaction liquid to be supplied, for example, a bag, and the tip of the storage portion 40 is provided with a rubber plug 42. A needle (not shown) is inserted into the plug 42, whereby the ink or reaction liquid in the bag 40 can be supplied to a head. Reference numeral 44 denotes an absorbent for receiving waste ink or waste reaction liquid. The surface of the storage portion 40 to be in contact with the ink or the reaction liquid is formed of preferably polyolefins, or particularly preferably polyethylene. As shown in, for example, FIG. 6, such cartridge is constituted so as to be detachable from a recording head 901 for ejecting an ink or a reaction liquid. In addition, in a state where the cartridge 45 is mounted on the recording head, the ink or the reaction liquid is supplied to the recording head 901.

EXAMPLES

Hereinafter, the present invention will be described more specifically by way of examples and comparative examples. However, the present invention is not limited to these examples. Unless otherwise stated, "%" means "mass %" and "part(s)" means "part(s) by mass". In addition, the term "balance" in the composition of reaction liquids or inks refers to the amount of water when the composition is adjusted in such a manner that the total amount of the reaction liquids or the inks prepared by mixing respective components is 100%.

<Preparation of Reaction Liquids 1 to 10>

The respective components shown in Table 1 below were mixed and sufficiently stirred for dissolution. After that, the resultant was filtered through a microfilter having a pore size of 0.2 μm (manufactured by Fuji Photo Film Co., Ltd.) under pressure to prepare each of reaction liquids 1 to 10. In Table 1 below, an Acetylenol EH (trade name; manufactured by Kawaken Fine Chemicals Co., Ltd.) was used as an ethylene oxide adduct of acetylene glycol.

TABLE 1

| | Reaction liquid | | | | | | | | | |
|---|---|---|---|---|---|---|---|---|---|---|
| | 1 | 2 | 3 | 4 | 5 | 6 | 7 | 8 | 9 | 10 |
| Zirconium acetate (aqueous solution having a solid content of 30 mass % in terms of $ZrO_2$) | 50.0 | | | 20.0 | 20.0 | | | | | |
| Zirconium nitrate (aqueous solution having a solid content of 25 mass % in terms of $ZrO_2$) | | | | | | 24.0 | | | | |
| Zirconium ammonium carbonate (aqueous solution having a solid content of 20 mass % in terms of $ZrO_2$) | | | | | | | 30.0 | | | |
| Polyaluminum chloride (aqueous solution having a solid content of 10 mass % in terms of $Al_2O_3$) | | 50.0 | | | | | | | | |
| Polyaluminum hydroxide (aqueous solution having a solid content of 15 mass % in terms of $Al_2O_3$) | | | 50.0 | | | | | | | |
| Calcium nitrate tetrahydrate | | | | 8.0 | | | | | | |
| Aluminum nitrate nonahydrate | | | | | | | | 10.0 | 10.0 | 5.0 |
| Sodium tetraborate decahydrate | | | | | | | | | 3.0 | |
| Ammonium sulfate | | | | | | | 10.0 | | | |
| Trimethylolpropane | 20.0 | 20.0 | 20.0 | 20.0 | 20.0 | 20.0 | 20.0 | 20.0 | 20.0 | 20.0 |
| Propylene glycol | 20.0 | 20.0 | 20.0 | 20.0 | 20.0 | 20.0 | 20.0 | 20.0 | 20.0 | 20.0 |
| Ethylene oxide adduct of acetylene glycol | 1.0 | 1.0 | 1.0 | 1.0 | 1.0 | 1.0 | 1.0 | 1.0 | 1.0 | 1.0 |
| Water | Balance | Balance | Balance | Balance | Balance | Balance | Balance | Balance | Balance | Balance |
| Zr content in terms of metal atom (mass %) | 11.1 | — | — | 4.4 | 4.4 | 4.4 | 4.4 | — | — | — |
| Al content in terms of metal atom (mass %) | — | 2.6 | 4.0 | — | — | — | — | — | — | — |

<Preparation of Bk Pigment Dispersion>

10 parts of a pigment [carbon black (product name: Monarch 880, manufactured by Cabot Co.)] was used as a coloring material. 20 parts of an anionic polymer (styrene-acrylic acid copolymer, acid value 190, weight average molecular weight 9,000, aqueous solution having a solid content of 10%, neutralizer: potassium hydroxide) was used as a dispersant. These materials and 70 parts of pure water were mixed. Then, the following materials were fed into a batch-type vertical sand mill (manufactured by IMEX Corporation), 150 parts of zirconia beads having a diameter of 0.3 mm were loaded therein, and then the whole was subjected to a dispersion treatment for 5 hours while being cooled with water. The dispersion liquid was subjected to a centrifugal separator to remove coarse particles. Thus, a Bk pigment dispersion having a solid content of about 12% and a weight average particle size of 100 nm was produced as a finally prepared product.

<Preparation of Bk Ink 1 and Bk Ink 2>

The respective components shown in Table 2 below including the Bk pigment dispersion thus obtained were mixed and sufficiently stirred for dissolution. After that, the resultant was filtered through a microfilter having a pore size of 3 μm (manufactured by Fuji Photo Film Co., Ltd.) under pressure to prepare each of Bk ink 1 and Bk ink 2. In Table 2 below, an Acetylenol EH (trade name; manufactured by Kawaken Fine Chemicals Co., Ltd.) was used as an ethylene oxide adduct of acetylene glycol.

TABLE 2

|  | Bk ink | |
| --- | --- | --- |
|  | 1 | 2 |
| Bk pigment dispersion | 40 | 40 |
| Glycerin | 10 | 10 |
| Diethylene glycol | 6 | 6 |
| Polyvinyl alcohol (having a saponification value of 88% and a weight average molecular weight of 8,000) |  | 3 |
| Ethylene oxide adduct of acetylene glycol | 1 | 1 |
| Water | Balance | Balance |
| Viscosity (at 25° C.) | 2.5 | 3.5 |

<Evaluation>

Each of the Bk ink 1 and the Bk ink 2 thus obtained was combined with each of the reaction liquids prepared in advance to provide a set of an ink and a reaction liquid, thereby forming an image. The resultant image was evaluated for an image density, marker resistance, and scratch resistance. And the storage stability of a reaction liquid, and a flocculation value of a set of an ink and a reaction liquid were evaluated.

To be specific, the images were made in the following manner, and evaluated in the method below and by the evaluation criteria below. Each of the reaction liquids 1 to 10 was applied to PPC paper (trade name; manufactured by CANON Inc.) by means of a bar coater. The amount of each of all the reaction liquids applied was 2.5 g/m$_2$. Immediately after the application of the reaction liquid, each of the Bk ink 1 and the Bk ink 2 was used to print a 2-cm square solid image and Chinese letters "電鷲" of 12 points with an ink-jet recording apparatus BJS700 (manufactured by CANON Inc.). The amount of the ink applied for printing at the solid image was 9.2 g/m$_2$.

(1) Evaluation of Image Density

After the image thus obtained had been left at room temperature for 1 day, the image density of the 2-cm square solid image was measured by means of a reflection densitometer (trade name: Macbeth RD-918; manufactured by Macbeth). The evaluation criteria for an image density are as follows. Table 3 shows the results of the evaluation.

<Evaluation Criteria of Image Density>

AA: An image density of 1.45 or more.
A: An image density of 1.35 or more and less than 1.45.
B: An image density of 1.30 or more and less than 1.35.
C: An image density of less than 1.30.

(2) Evaluation of Marker Resistance

The image thus obtained was left for 10 minutes after the printing. After that, a line was drawn on the part of the Chinese letters "電鷲" by means of a marker pen (trade name: OPTEX; manufactured by ZEBRA CO., LTD.), and the degree of ink soiling was contaminated at the site where the marker pen was drawn was visually observed. The evaluation criteria for marker resistance are as follows. Table 3 shows the results of the evaluation.

<Evaluation Criteria of Marker Resistance>

AA: No soiling of ink is observed.
A: Soiling of ink is nearly inconspicuous.
B: Soiling of ink is slightly observed.
C: Soiling of ink is remarkable.

(3) Evaluation of Scratch Resistance

The image thus obtained was left for 30 seconds after the printing. After that, the 2-cm square solid image was rubbed with a finger, and the degree to which ink was transferred onto a white paper portion was visually observed. The evaluation criteria for scratch resistance are as follows. Table 3 shows the results of the evaluation.

<Evaluation Criteria of Scratch Resistance>

AA: No transfer of ink is observed.
A: Transfer of ink is nearly inconspicuous.
B: Transfer of ink is slightly observed.
C: Transfer of ink is remarkable.

(4) Evaluation of Storage Stability of Reaction Liquid

Each of the reaction liquids thus prepared was left at 60° C. for 10 days. Then, the presence or absence of the whitening of the reaction liquid and the formation of a precipitate was visually observed. The evaluation criteria for the storage stability of a reaction liquid are as follows. Table 3 shows the results of the evaluation.

<Evaluation Criteria of Storage Stability of Reaction Liquid>

A: Neither whitening of a liquid nor formation of a precipitate occurs.
B: A liquid whitens or a precipitate is formed.

(5) Evaluation of Flocculation Value

Each reaction liquid and each Bk ink thus prepared were used to measure a flocculation value. To be specific, 5 g of the reaction liquid 100-times diluted with pure water were charged into a vessel having an inner diameter of 10 mm, 0.25 g of the Bk ink was added dropwise to the vessel, and the whole was left standing for 60 minutes. After that, the ratio of the height of an aggregate to the height from the bottom surface of the vessel to a liquid level was determined. The evaluation criteria for a flocculation value are as follows. Table 3 shows the results of the evaluation.

<Evaluation Criteria of Flocculation Value>

AA: A flocculation value of less than 0.3.
A: A flocculation value of 0.3 or more and less than 0.4.
B: A flocculation value of 0.4 or more and less than 0.5.
C: A flocculation value of 0.5 or more.

TABLE 3

|  |  | Reaction liquid | Bk ink | Image density | Marker resistance | Scratch resistance | Storage stability of reaction liquid | Precipitation value |
|---|---|---|---|---|---|---|---|---|
| Example | 1 | 1 | 1 | A | A | AA | A | AA |
|  | 2 | 1 | 2 | A | AA | AA | A | AA |
|  | 3 | 2 | 2 | AA | A | A | A | AA |
|  | 4 | 3 | 2 | A | A | A | A | AA |
|  | 5 | 4 | 1 | AA | A | AA | A | AA |
|  | 6 | 4 | 2 | AA | AA | AA | A | AA |
|  | 7 | 5 | 1 | A | A | AA | A | A |
|  | 8 | 6 | 1 | A | A | AA | A | A |
|  | 9 | 7 | 1 | B | A | AA | A | B |
| Comparative example | 1 | 8 | 1 | A | B | B | A | A |
|  | 2 | 8 | 2 | A | B | B | A | A |
|  | 3 | 9 | 2 | A | A | A | B | A |
|  | 4 | 10 | 1 | B | B | B | A | B |

This application claims the benefit of priorities from Japanese Patent Application No. 2004-357419 filed on Dec. 09, 2004, and Japanese Patent Application No. 2005-329629 filed on Nov. 15, 2005, which are hereby incorporated by reference herein.

What is claimed is:

1. An image recording method of recording an image by applying, to a recording medium, (a) an ink composition comprising a coloring material in a dispersed state and (b) a reaction liquid comprising (1) at least one polyvalent metal compound selected from the group consisting of zirconium nitrate, zirconium sulfate, zirconium chloride, zirconium acetate, polyaluminum hydroxide, and polyaluminum chloride, and (2) a divalent or trivalent metal ion or a salt thereof, wherein the content of the at least one polyvalent metal compound selected from the group consisting of zirconium nitrate, zirconium sulfate, zirconium chloride, zirconium acetate, polyaluminum hydroxide, and polyaluminum chloride in the reaction liquid is 0.01 mass % or more and 30.0 mass % or less, in terms of metal atoms, wherein the image recording method comprises the steps of:

(i) applying the ink composition to the recording medium by means of an ink-jet method; and (ii) applying the reaction liquid to the recording medium, and wherein the steps (i) and (ii) are performed in such a manner that the ink composition and the reaction liquid, each in a liquid state, contact with each other on the recording medium, wherein the ink composition further comprises a nonionic polymer wherein the at least one polyvalent metal compound selected from the group consisting of zirconium nitrate, zirconium sulfate, zirconium chloride, zirconium acetate, polyaluminum hydroxide, and polyaluminum chloride is zirconium acetate, and wherein the salt of the divalent or trivalent metal ion is calcium nitrate tetrahydrate.

2. An image recording method according to claim 1, wherein the ink composition contains at least one kind of anionic polymer.

3. An image recording method according to claim 1, wherein the coloring material is present in a dispersed state in the ink composition owing to an anionic polymer.

* * * * *